(12) United States Patent
Karnik

(10) Patent No.: US 7,904,472 B1
(45) Date of Patent: Mar. 8, 2011

(54) SCANNING APPLICATION BINARIES TO IDENTIFY DATABASE QUERIES

(75) Inventor: Neeran Mohan Karnik, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 105 days.

(21) Appl. No.: 11/522,786

(22) Filed: Sep. 18, 2006

(51) Int. Cl.
*G06F 7/00* (2006.01)
*G06F 17/30* (2006.01)

(52) U.S. Cl. .......................... 707/779; 707/780

(58) Field of Classification Search .................... 707/6, 7
See application file for complete search history.

(56) References Cited

U.S. PATENT DOCUMENTS

| | | | |
|---|---|---|---|
| 6,466,931 B1 | 10/2002 | Attaluri et al. | 707/2 |
| 7,444,331 B1* | 10/2008 | Nachenberg et al. | 1/1 |
| 7,720,867 B2* | 5/2010 | Subramanian et al. | 707/793 |
| 2003/0069880 A1* | 4/2003 | Harrison et al. | 707/3 |
| 2003/0220917 A1* | 11/2003 | Copperman et al. | 707/3 |
| 2006/0212438 A1* | 9/2006 | Ng | 707/4 |
| 2006/0248080 A1* | 11/2006 | Gray | 707/7 |
| 2007/0192623 A1* | 8/2007 | Chandrasekaran | 713/189 |
| 2008/0047009 A1* | 2/2008 | Overcash et al. | 726/23 |

OTHER PUBLICATIONS

Wikipedia, "Binary File", http://en.wikipedia.org/wiki/Binary_file. *
Buehrer, Gregory T., Bruce W. Weide, and Paolo A. G. Sivilotti; "Using Parse Tree Validation to Prevent SQL Injection Attacks," Computer Science and Engineering, The Ohio State University, Columbus, Ohio, 43210; Sep. 2005, pp. 106-113.
Halfond, William G. J. and Alessandro Orso, Preventing SQL Injection Attacks Using AMNESIA,: Colluge of Computing, Georgia Institute of Technology, May 20-28, 2006; pp. 7950-0798.
Halfond, William G. J. and Alessandro Orso, "Combining Static Analysis and Runtime Monitoring to Counter SQL-Injection Attacks," College of Computing, Georgia Institute of Technology; May 17, 2005; 7 pages.

* cited by examiner

*Primary Examiner* — Cam Y T Truong
(74) *Attorney, Agent, or Firm* — Campbell Stephenson LLP

(57) ABSTRACT

Binary files of one or more applications are scanned to identify database command templates contained therein, wherein each DB command template comprises a sequence of elements including one or more input markers. Once the DB command templates are identified, they are copied to a memory. While in the memory, the command templates can be used to identify abnormal DB commands. In one embodiment of a method, a first template is generated in response to receiving a first DB command from a computer system, wherein the first DB command comprises a sequence of elements including one or more user input values. The first template can be generated by replacing all user input values in the received first DB command with input markers. Thereafter the first template is compared to one or more of the DB command templates copied to the memory.

13 Claims, 4 Drawing Sheets

SCANNING APPLICATION BINARIES TO IDENTIFY DATABASE QUERIES

BACKGROUND OF THE INVENTION

The ease of use and general applicability of relational databases has resulted in their extensive use in many different environments. Business, especially, have found relational databases appropriate for their needs. For example, businesses often employ accounting applications that operate on underlying relational databases. The present invention will be described with reference to relational databases, it being understood that the present invention may find use in conjunction with other types of databases.

A relational database stores its data in tables. A table contains a set of rows and columns. Each row has a set of columns, and each column in a row has only one value or entry. All rows in the same table have the same set of columns. A row from a relational table is often referred to as a record, and a column to a field.

Consider for example, the relational database "Employees" shown below:

| Employees | | | |
|---|---|---|---|
| Name | Salary | Position | Age |
| Mark Ryan | 42000 | Manager | 44 |
| Dean Reagan | 40000 | Engineer | 28 |
| Pam McClelland | 45000 | President | 34 |
| Jim Tressel | 95000 | Vice President | 55 |
| Vince Young | 75000 | Chief Financial Officer | 21 |

The Employees table contains five records, each record containing four fields. Each field of a record contains a value or entry. For example the field designated "Age" in the first record stores "44" as its value.

Structured Query Language (SQL) is the most popular computer language used with relational databases. Operations on relational databases including operations to query, insert, update, and delete data from tables can be performed using SQL commands or statements. For example, commands called SQL queries can be used to retrieve data from one or more tables in a relational database for subsequent processing by an application executing on a computer system (e.g., a server). When a SQL query is generated, there is no need to explicitly tell the database where to look for the data sought by the SQL query. It is enough to simply identify the data sought in the SQL query. Database management systems will take care of locating the data sought in response to receiving and implementing the SQL query.

Relational databases operations, including data queries, are performed by implementing SQL queries on tables stored in the database. Two of the more basic query operations include retrieving a subset of columns from a table and retrieving a subset of rows from a table. To illustrate, the SQL query:

SELECT*FROM Employees WHERE Salary <45000; Query 1 can be used retrieve all records in the Employees table above whose "Salary" field contains a value less than 45000. In response to implementing Query 1, a database management system operating in conjunction with the relational database storing the Employees, would return the following records:

TABLE 1

| Name | Salary | Position | Age |
|---|---|---|---|
| Mark Ryan | 42000 | Manager | 44 |
| Dean Reagan | 40000 | Engineer | 28 |

Retrieving a subset of columns from a table is another important query operation that can be performed on a relational table. To illustrate, the SQL query:

SELECT Name, Age FROM Employees; Query 2 can be used to retrieve all names and corresponding ages from the Employees table. In response to implementing Query 2, a database management system, operating in conjunction with the relational database storing the Employees table, would return:

TABLE 2

| Name | Age |
|---|---|
| Mark Ryan | 44 |
| Dean Reagan | 28 |
| Pam McClelland | 34 |
| Jim Tressel | 55 |
| Vince Young | 21 |

An application, and its underlying relational database, can be accessed by users after they login via, for example, a client computer system. SQL queries are often used during user login. Users, during login, provide credentials by typing their username (e.g., RMS) and password (e.g., Soccer) into respective fields of an interface displayed on the client computer system. This information is passed to an application, which in turn may generate the following SQL query from the user supplied input values:

SELECT*FROM Users WHERE Username='RMS' AND Pass='Soccer'; Query 3

In response to implementing Query 3, the database management system, operating in conjunction with the relational database storing the "Users" table, would return a record back to the application. The application manipulates data of the record, creates a session, and then passes a subset to the client computer system of the user, which in turn displays a menu of options and personalized information. Notice the application generates an SQL query based on input values provided by the user.

Applications executing on servers (i.e., server applications) generate SQL queries in response to receiving requests from client computer systems. The present invention will be described with reference to a server-client data processing system, it being understood that the present invention should not be limited thereto. In many application programming languages, the standard technique for generating SQL queries is to insert specialized statements called SQL query templates into the source code. Each SQL query template can be used at runtime to generate one of several predetermined SQL queries as will be more fully described below. Server applications can also generate SQL queries dynamically in response to receiving a request from a client computer system. W. Halfond and A. Orso, Combining Static Analysis and Runtime Monitoring to Counter SQL-Injection Attacks; In proceedings of the Workshop on Dynamic Analysis (WODA 2005), gives an example of dynamically generated SQL queries. For the purposes of explanation only, the present invention will be described with reference to server applications generating SQL queries using embedded SQL query templates only, it being understood that the present invention can be used in conjunction with server applications that also generate SQL queries dynamically.

Once SQL queries are generated by a server application, the SQL queries are transmitted to a database management system as noted above. The database management system, in turn, implements an SQL query by generating one or more database transactions for retrieving data from the underlying database. Ultimately, the database management system returns database data to the requesting server application for subsequent processing. To illustrate, FIG. 1 shows relevant components of an exemplary data processing system employed by a business. The system shown in FIG. 1 contains a database server 10 coupled between an application server 12 and a relational database 14. A server application (Application A, not shown) executes on one or more processors of application server 12. The relational database 14 contains tables, including the "Users" and "Employees" tables described above, which are accessible by a database management system (not shown) executing on one or more processors of database server 10. The database management system receives SQL queries from Application A deployed on server 12. Application A can be considered a client to the database management system executing on server 10. Application A never accesses the data contents of database 10 directly, but only generates SQL queries to be implemented by the database management system. This allows sophisticated features, such as transaction processing, recovery, backup, access control, etc., to be added to database server 10 without increasing the complexity of Application A or other applications that generate the SQL queries. Data corruption risk is also reduced since the database server is the only device with access to the underlying database 14. The relational database 14 may be stored on one or more memory devices (e.g., disc arrays, not shown). A volume manager or other software (not shown) may logically aggregate the memory devices to form a data storage object (e.g., a volume) on which relational database 14 is stored.

Application server 12 is also coupled to client computer systems 16 or 18 via network 20, which may take form in a LAN, WAN, the Internet, etc., or a combination thereof. Application A generates one or more SQL queries in response to receiving a request from a user via client computer system 16 or 18. For example, a user of client computer system 18, after logging into Application A, may seek a list of all employees of the business that have a salary less than $45,000. The request is transmitted to application server 12, which in turn generates Query 1 shown above in accordance with the code of Application A. The database management system executing on server 10 receives and implements Query 1, and in turn generates one or more database transactions for retrieving data from relational database 14. The data retrieved from database 14 is provided to Application A executing on server 12 for subsequent presentation to the user via client computer system 18. In one embodiment, Table 1 above is presented to the user of client computer system 18.

Server applications, such as Application A executing on server 12, can generate various types of SQL queries for subsequent implementation by database management systems. These server applications typically provide a limited set of functional features (e.g., identify all employees who make less than a certain amount of money) to users of client computer systems, which means the server applications can generate a limited set of SQL queries. In other words, the possible SQL queries that can be generated by a server application is limited to that envisaged by the developer of the server application.

Compiled server applications, such as Application A executing on server 12, consist of binary files (e.g., executable files, libraries, etc) that contain embedded SQL query templates. For example, Application A executing on server 12 contains executable files or libraries, which in turn contain the following exemplary SQL query templates:

SELECT*FROM Employees WHERE Salary <?; Template 1

SELECT Info FROM Users WHERE login='?' AND pass='?'; Template 2

Embedded SQL query templates, such as Template 1 and Template 2, represent the possible SQL queries envisaged by the application developer to be generated. The SQL query templates contain input markers (e.g., "?") that are replaced at runtime by, for example, input values as is more fully described below. It is noted that SQL query templates are inserted in the source code of applications. When the source code is compiled, the strings comprising the SQL query templates are usually stored as is, in specific binary files.

SQL query templates are used at runtime to create respective SQL queries. To illustrate, when Application A receives a request from a client computer system, and the request includes user input values, an SQL query is generated by replacing the input markers (i.e., "?") of the appropriate SQL query template with the user input values contained in the request. For example, when Application A executing on server 12 receives the request to identify all employees who make less than $45,000 as described above, the accounting application replaces the input markers "?" of Template 1 with "45000," thereby generating Query 1. The resulting SQL query is then sent to and implemented by database server 10 as described above.

As noted, database-driven server applications have become widely employed by businesses. These applications provide a broad range of services to their users. However, these applications, and their underlying relational databases, often contain confidential or even sensitive information, such as financial records. This information can be valuable and makes database-driven server applications an ideal target for attacks. One type of attack in particular, SQL-Injection attacks (SQLIA's) is especially harmful. SQLIA's can give attackers direct access to an underlying database, and, with that, the power to leak, modify, or even delete information. SQLIA's generally occur when input provided by a user is not properly validated and is inserted directly into a template to generate an SQL query.

To illustrate, as noted above, before a user can access Application A executing on server 12, and its underlying database 14, the user must provide his credentials by entering his username (e.g., RMS) and password (e.g., Soccer) into the appropriate fields of the user interface displayed on client computer system 16. Once the user's login name and password are entered, the user activates the submit button, and client computer system generates and sends a login request to application server 12 via network 20. The login request includes the username and password input values entered by the user. Application A executing on application server 12 generates a corresponding SQL query in response to receiving the login request from client computer system 16. More particularly, Application A replaces the first and second input markers of Template 2 above with the login name and password of the login request, respectively, thereby generating Query 3 above. After Query 3 is generated, it is transmitted to database server 10 for implementation. The database management system operating on server 10 returns a record from the "Users" table to application server 12. Application A manipulates data of the record, creates a session, and then passes a subset to client computer system 16, which in turn displays a menu of options and personalized information.

However, if instead of inserting RMS and Soccer as input values into the username and password fields of the interface displayed on client computer system 16, the user maliciously enters "' OR 1=1--" and " " and activates the submit button, client computer system 16 will send a login request containing "' OR 1=1--" and " " to server 12. Application A would replace the input markers of Template 2 with "' OR 1=1--" and " " thereby generating the following SQL query:

SELECT Info FROM Users WHERE login=' ' OR 1=1--' AND pass=' '; Query 5

Query 5 is subsequently sent to the database management system, which interprets everything after the WHERE keyword token as a conditional statement. The "' OR 1=1--" clause turns this conditional into a tautology. As a result of implementing Query 5, the database management system 10 and database 14, operating collectively, returns all records in the Users table, which in turn is forwarded by Application A to client computer system 16 for display thereon. As can be appreciated, an attacker could insert a wide range of SQL commands via this mechanism, including commands to modify or destroy database tables.

Database audit and security (DBAS) systems have been developed to protect database systems from malicious attacks, such as the SQLIA described above. In general, DBAS systems analyze all SQL queries before they are forwarded to a database management system. If a SQL query is deemed abnormal by the DBAS system, the DBAS system alerts a system administrator before the abnormal SQL command is forwarded. FIG. 2 illustrates the system shown in FIG. 1 with a DBAS system 22 interposed between application server 12 and database server 10. DBAS system 22 may take form in application code executing on a computer system. In operation, DBAS system 22 receives an SQL query from application server 12. The received SQL query is parsed into constituent elements using known SQL query string parsing technology. The elements of the parsed SQL query are then identified as SQL keywords (e.g., SELECT, FROM, WHERE, etc.), operators (e.g., =, <, >, etc.), delimiters (e.g., commas or semicolons), attributes (e.g., table names such as "Users," column names such as "Pass," (see, Query 3 above) etc.), and input values (e.g., numbers or text that immediately follow an operator). The input values of received SQL query are replaced by input markers (i.e., "?") to generate an SQL query template, which in turn is compared with known, acceptable SQL query templates stored in a knowledge base. If the SQL query template corresponding to the received SQL query compares equally to a known, acceptable SQL query template in the knowledge base, the received SQL query is forwarded to database server 10. Otherwise, the received SQL query is deemed abnormal or malicious.

Before DBAS system 22 can begin to operate for its intended purpose, the knowledge base must be populated with known, acceptable SQL query templates. DBAS system 22 learns about typical, normal SQL queries by observing network-level traffic sent to database server 10 during a training phase. The knowledge base can be populated with normal SQL query templates, which are created based on the typical, normal SQL queries received during the training phase. As can be appreciated, a substantial amount of time might be needed during the training phase to populate the DBAS systems' knowledge base with normal SQL query templates. The time needed for the training phase may be unacceptable to a business that needs rapid deployment of DBAS system 22.

SUMMARY OF THE INVENTION

In one embodiment of the present invention, code (e.g., binary or source code) of an application is scanned to identify SQL query templates contained therein, wherein each identified SQL query template comprises a sequence of elements including one or more input markers. Once the SQL query templates are identified, they are copied from a memory of a first computer system in which the application is deployed to a memory of a second computer system. Once copied, the SQL query templates can be used to identify abnormal SQL queries. To illustrate one embodiment of a method of the present invention, a first template is generated in response to receiving a first SQL query from, for example, the first computer system, wherein the first SQL query comprises a sequence of elements including one or more input values. The first template can be generated by replacing input values in the received first SQL query with input markers. Thereafter the first template is compared to one or more of the SQL query templates copied to the memory of the second computer system. If the first template compares equally to one of the copied SQL templates, the first SQL query may be passed to a database system. If the first template does not compare equally with any of the SQL query templates copied to the memory of the second computer system, the first SQL query may be labeled as "abnormal" and possibly dropped. Importantly, the SQL query templates can be copied to memory of the second computer system and subsequently used to identify abnormal SQL queries without having to modify or delete code of the application.

BRIEF DESCRIPTION OF THE DRAWINGS

The present invention may be better understood, and its numerous objects, features, and advantages made apparent to those skilled in the art by referencing the accompanying drawings.

The use of the same reference symbols in the drawings indicates similar or identical items.

DETAILED DESCRIPTION

The present invention, in one embodiment, is directed to an apparatus and method for scanning application binaries to identify SQL query templates contained therein. SQL query templates identified during the scan can be copied to memory for subsequent use in a database audit and security system. More particularly, the identified SQL query templates can be used to prevent abnormal or malicious SQL queries from reaching a database server during runtime. As will be more fully described below, the present invention will be described with reference to scanning binary files (e.g., executable files, libraries, etc.) for SQL query templates, it being understood that the present invention should not be limited thereto; the present invention could be used to scan binary files for SQL command templates other than SQL query templates.

In the following description, the preferred embodiment of the present invention can be implemented as a computer program executing on a processor of a computer system, although those skilled in the art will readily recognize that the equivalent of such software may also be constructed in hardware or a combination of hardware and software. If the invention is implemented as a computer program, the program may be stored in a conventional computer readable medium that may include, for example: magnetic storage media such as a magnetic disk (e.g., a disk drive); optical storage media such as an optical disk; solid state electronic storage devices such as random access memory (RAM), or read only memory (ROM); or any other storage device or storage medium employed to store computer program instructions.

Figure 1:
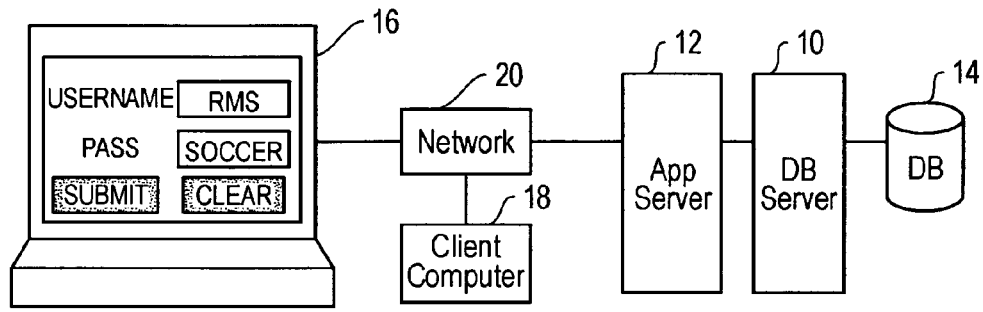
FIG. 1 is a block diagram illustrating relevant components of a data processing system.
Figure 2:
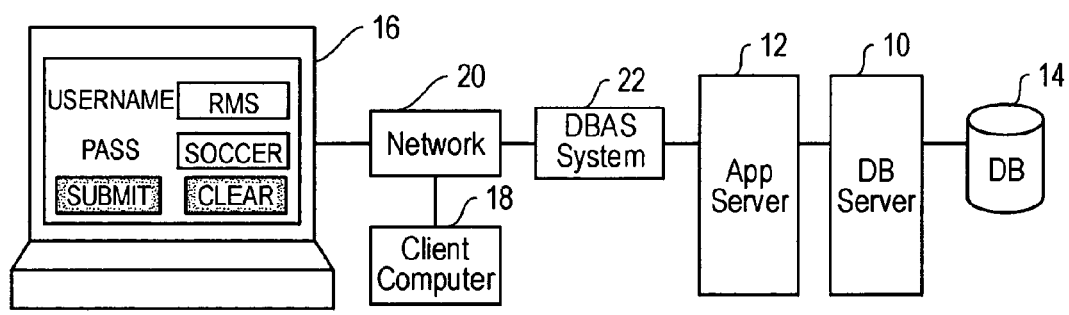
FIG. 2 shows the data processing system of FIG. 1 with a database audit and security system added thereto.
Figure 3:
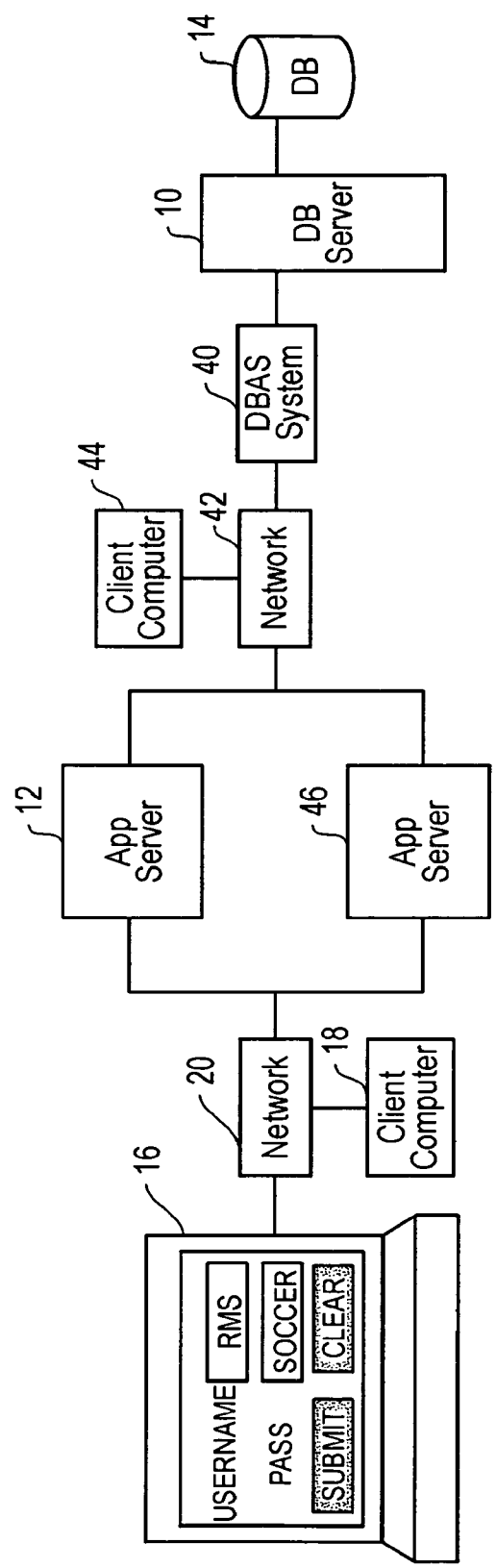
FIG. 3 is a block diagram illustrating relevant components of a data processing system employing one embodiment of the present invention.

FIG. 3 illustrates in block diagram form, relevant components of a data processing system employing one embodiment of the invention. The data processing system of FIG. 3 includes many of the components of the data processing system of FIG. 2. In particular, FIG. 3 includes the data base server 10 coupled to relational database 14, and application server 12 coupled to client computer systems 16 and 18 via network 20. Additionally, the data processing system of FIG. 4 includes a network 42 which couples application server 12, application server 46, and client computer system 44 to database audit and security (DBAS) system 40. Compiled Application A and compiled Application B (not shown) are deployed on servers 12 and 46, respectively, although in an alternative embodiment Applications A and B may be deployed on the same server. Each of compiled Applications A and B include one or more binary files (e.g., executable files, libraries, etc.) that contain SQL query templates. One or more of the binary files of Application A include Templates 1 and 2 set forth in the background section above. One or more of the binary files of Application B contains SQL query templates including:

SELECT Name, E_Mail FROM Addr_Book WHERE Company='?'; Template 3

SELECT ID, Name FROM Category WHERE Parent='?' Template 4

Templates 3 and 4 include input markers (e.g., "?") like Templates 1 and 2. Although, the input markers of exemplary Templates 1-4 are contained in the conditional WHERE phrase, the present invention should not be limited to use with SQL query templates that contain input markers only in the conditional WHERE phrase. The present invention can be used in conjunction with SQL query templates that contain input markers in the SELECT phrase, or with SQL query templates that contain input markers in the conditional WHERE phrase and the SELECT phrase.

Application B generates one or more SQL queries in response to receiving a request from, for example, client computer system 46. Requests can be processed in accordance with the code of Application B to generate SQL queries in much the same way Application A generates SQL queries in response to receiving requests. Thus, when Application B receives a request for data contained in relational database 14, and when the request includes input values, an SQL query is generated by replacing the input markers of the appropriate SQL query template contained in a binary file of Application B with the input values contained in the request. Any SQL query generated by Application A or Application B is transmitted to DBAS system 40 for auditing via network 42 as will be more fully described below. If an SQL query is considered normal, DBAS system 40 passes the SQL query to database server 10. The database management system executing on server 10 receives and implements SQL queries deemed normal by DBAS system 40.

Figure 4:
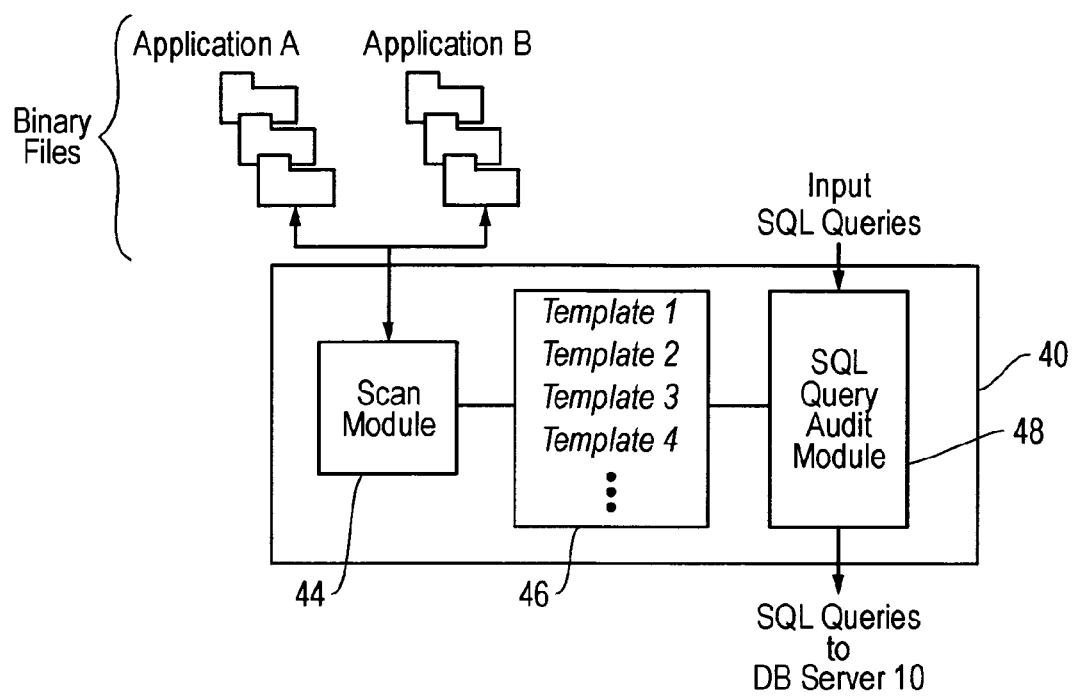
FIG. 4 is a block diagram illustrating relevant components of the database audit and security system shown in FIG. 3.

DBAS system 40 may take form in a computer system executing code on one or more processors. FIG. 4 shows in block diagram form, relevant components of DBAS system 40 of FIG. 4. More particularly, DBAS system 40 shown in FIG. 4 includes a scan module 44, which may take form in instructions executing on one or more processors. Scan module 44 is in data communication with binary files of Application A and Application B stored within respective memories of application servers 12 and 46, respectively. During a training phase (i.e., before SQL queries are received from servers 12 or 46) scan module 44 scans binary files of compiled applications, such as Application A and Application B deployed on application servers 12 and 46, respectively. Scan module 44 scans the binary files for SQL query templates. When scan module 44 identifies an SQL query template contained within a binary file of Application A or Application B, scan module 44 copies the identified SQL query template to knowledge base memory 46. In one embodiment, DBAS system 40 employs known SQL query string parsing technology to identify SQL queries received from application servers 12 and 46 via network 42 during runtime (i.e., after the training phase). This same parsing technology can be employed by scan module 44 during binary file scan process to identify SQL query templates contained in binary files of Applications A and B on servers 12 and 46, respectively. In an alternative embodiment, the binary files of Application A and Application B which are known to contain SQL query templates, can be provided to and temporarily stored in memory of DBAS system 40 for direct scanning by scan module 44. In this alternative embodiment, scan module 44 scans the binary files for SQL query templates without having to go through network 42.

The knowledge base memory 46 of FIG. 4 graphically illustrates Templates 1-4 copied by scan module 44 from binary files of Applications A and B on servers 12 and 46, respectively. Although not shown, knowledge base memory 46 may have additional SQL query templates stored therein. Some of these additional SQL query templates may have been provided to and stored in knowledge base memory 46 independent of scan module 44.

Figure 5:
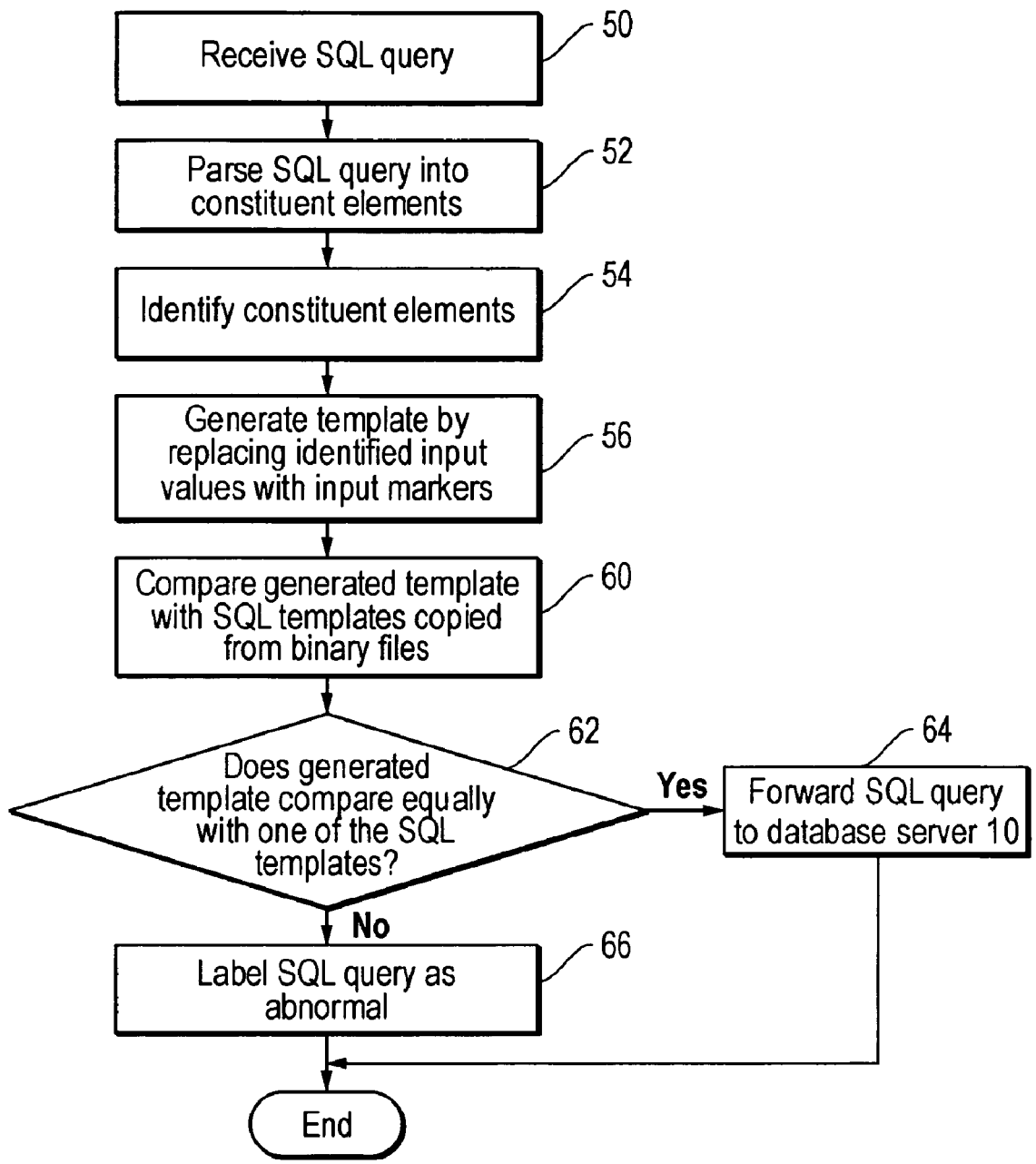
FIG. 5 illustrates relevant aspects of a process for auditing an SQL query using SQL query templates copied from binary files of an application in accordance with one embodiment of the present invention.

DBAS system 40 also includes an SQL query audit module 48 which may take form in instructions executing on one or more processors. During runtime, audit module 48 receives and audits SQL queries destined for database server 10. FIG. 5 is a flowchart illustrating operational aspects of audit module 48. In step 50, filter module receives an SQL query from application server 12 or application server 46. In response to receiving the SQL query, audit module 48 parses the SQL query into constituent elements using known SQL query string parsing technology as shown in step 52. The elements of the parsed SQL query are then identified as SQL keywords, operators, delimiters, attributes, and input values as shown in step 54. For example, a sequence of transactions within the SQL query received in step 50 labeled "S," "E," "L," "E," "C," and "T" would be recognized as the SQL SELECT keyword and suitably grouped into and identified as such.

Input values of received SQL query identified in step 54 are then replaced by input markers (i.e., "?") to generate an SQL query template as shown in step 56. The SQL query template generated in step 56 is compared with the SQL query templates copied to memory 46 as shown in step 60. If the SQL query template generated in step 56 compares equally to an SQL query template in memory 46, the SQL query received in step 50 is forwarded to database server 10. Otherwise, the received SQL query may be deemed abnormal or malicious.

As noted, SQL query templates copied from binary files can be used by DBAS system 40 to identify abnormal or malicious SQL queries. To illustrate, suppose DBAS system 40 shown in FIG. 4 receives:

SELECT Info FROM Users WHERE login=' ' OR 1=1--'
AND pass=' '; Query 5
which is the same malicious SQL query described in the background section above. In accordance with the process shown in FIG. 5, audit module 48, parses Query 5, identifies the input values, and replaces the identified input values with input markers, resulting in the following template:

SELECT Info FROM Users WHERE login='?' OR 1=1--'
AND pass='?'; Template 5

Audit module than compares Template 5 with the templates stored in memory 46. Because Template 5 does not compare equally with the templates stored in memory 46, including Template 2 shown in the background section above, audit module 50 labels the received SQL query as abnormal or malicious.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

I claim:

1. A method comprising:
   scanning one or more compiled application source code files using a Structure Query Language (SQL) query string parser technology;
   identifying a Structure Query Language (SQL) query template in response to the scanning, wherein the SQL query template comprises a sequence of elements including one or more input markers;
   receiving a first SQL query from a computer system, wherein
      the first SQL query comprises a sequence of elements including one or more input values;
   parsing the first SQL query, wherein the parsing identifies the one or more input values;
   generating a template by replacing the one or more input values in the first SQL query with input markers;
   comparing the template to the SQL query template;
   passing the first SQL query to a database server if the template is equally the SQL query template;
   scanning one or more compiled second application source code files; and
   identifying a second SQL query template in response to the scanning the one or more compiled second application source code files, wherein
      the second SQL query template comprises a sequence of elements including one or more second input markers;
   receiving a second SQL query from a second computer system, wherein
      the second SQL query comprises a sequence of elements including one or more second input values;
   parsing the second SQL query, wherein the parsing identifies the one or more second input values;
   generating a second template by replacing all input values in the received second SQL query with second input markers;
   comparing the second template to the second SQL query template, the second template is different from the first template; and
   retrieving data based on the comparing the second template to the second SQL query template.

2. The method of claim 1, wherein the one or more compiled application source code files are stored in memory accessible by or contained in the computer system.

3. The method of claim 1 wherein the compiled second application source code files are stored in memory of the second computer system.

4. The method of claim 1, wherein the SQL query template comprises SQL token keywords or SQL token operators.

5. The method of claim 1, further comprising an act of passing the SQL query to a database server if the template is equally the SQL query template.

6. A computer readable storage medium comprising instructions executable by a first computer system for performing steps:
   scanning one or more compiled application source code files using a Structure Query Language (SQL) query string parser technology;
   identifying a Structure Query Language (SQL) query template in response to the scanning, wherein the SQL query template comprises a sequence of elements including one or more input markers;
   receiving a first SQL query from a computer system, wherein
      the first SQL query comprises a sequence of elements including one or more input values;
   parsing the first SQL query, wherein
      the parsing identifies the one or more input values;
   generating a template by replacing the one or more input values in the first SQL query with input markers;
   comparing the template to the SQL query template;
   passing the first SQL query to a database server if the template is equally the SQL query template;
   scanning one or more compiled second application source code files; and
   identifying a second SQL query template in response to the scanning the one or more compiled second application source code files, wherein
      the second SQL query template comprises a sequence of elements including one or more second input markers;
   receiving a second SQL query from a second computer system, wherein
      the second SQL query comprises a sequence of elements including one or more second input values;
   parsing the second SQL query, wherein
      the parsing identifies the one or more second input values;
   generating a second template by replacing all input values in the received second SQL query with second input markers;
   comparing the second template to the second SQL query template, the second template is different from the first template; and
   retrieving data based on the comparing the second template to the second SQL query template.

7. The computer readable storage medium of claim 6 wherein the method further comprises an act of passing the first SQL query to a database server if the first template is equally to the SQL query template.

8. The computer readable storage medium of claim 6 wherein the compiled application source code files are accessible by the second computer system.

9. The computer readable storage medium of claim 6 wherein the SQL query template comprise SQL command templates.

10. The computer readable storage medium of claim 6 wherein the SQL query template further comprises SQL token keywords or SQL token operators.

11. The computer readable storage medium of claim 6 wherein the method further comprises an act of passing the second SQL query to a database server if the second template compares equally to second SQL query template.

12. A computer system comprising:
a microprocessor;
a first memory communication with the microprocessor, wherein the first memory stores instructions executable by the microprocessor;
wherein the microprocessor implements a method for executing the instructions stored in the first memory, the method comprising:
scanning one or more compiled application source code files using a Structure Query Language (SQL) query string parser technology;
identifying a Structure Query Language (SQL) query template in response to the scanning, wherein the SQL query template comprises a sequence of elements including one or more input markers;
receiving a first SQL query from a computer system, wherein
the first SQL query comprises a sequence of elements including one or more input values;
parsing the first SQL query, wherein the parsing identifies the one or more input values;
generating a template by replacing the one or more input values in the first SQL query with input markers;
comparing the template to the SQL query template;
passing the first SQL query to a database server if the template is equally the SQL query template;
scanning one or more compiled second application source code files; and
identifying a second SQL query template in response to the scanning the one or more compiled second application source code files, wherein
the second SQL query template comprises a sequence of elements including one or more second input markers;
receiving a second SQL query from a second computer system, wherein
the second SQL query comprises a sequence of elements including one or more second input values;
parsing the second SQL query, wherein
the parsing identifies the one or more second input values;
generating a second template by replacing all input values in the received second SQL query with second input markers;
comparing the second template to the second SQL query template, the second template is different from the first template; and
retrieving data based on the comparing the second template to the second SQL query template.

13. The computer system of claim 12 wherein the method further comprises passing the first SQL query to a database server if the first template is equally to one of the SQL query templates.

* * * * *